United States Patent [19]

Krupp et al.

[11] Patent Number: 5,112,686
[45] Date of Patent: May 12, 1992

[54] LINEAR ETHYLENE POLYMER STAPLE FIBERS

[75] Inventors: Stephen P. Krupp, Houston; John O. Bieser; Edward N. Knickerbocker, both of Lake Jackson, all of Tex.

[73] Assignee: The Dow Chemical Company, Midland, Mich.

[21] Appl. No.: 428,280

[22] Filed: Oct. 27, 1989

Related U.S. Application Data

[63] Continuation-in-part of Ser. No. 339,335, Apr. 17, 1989, Pat. No. 4,990,204, which is a continuation of Ser. No. 114,169, Oct. 27, 1987, Pat. No. 4,842,922.

[51] Int. Cl.$^5$ .......................... D01F 8/06; D01F 6/30; C08L 23/08; C08L 23/16
[52] U.S. Cl. .................................. 428/401; 525/240; 525/324; 428/296
[58] Field of Search ................. 525/240; 428/198, 401

[56] References Cited

U.S. PATENT DOCUMENTS

| | | | |
|---|---|---|---|
| 3,914,342 | 10/1975 | Mitchell | 525/53 |
| 4,076,698 | 2/1978 | Anderson et al. | 526/348.6 |
| 4,429,079 | 1/1984 | Shibata et al. | 525/240 |
| 4,438,238 | 3/1984 | Fukushima et al. | 525/240 |
| 4,578,414 | 3/1986 | Sawyer et al. | 524/310 |
| 4,584,347 | 4/1986 | Harpell et al. | 525/119 |
| 4,644,045 | 2/1987 | Fowells | 526/348 |
| 4,705,829 | 11/1987 | Kwack et al. | 525/240 |
| 4,824,912 | 4/1989 | Su | 525/240 |
| 4,842,922 | 6/1989 | Krupp et al. | 428/198 |

FOREIGN PATENT DOCUMENTS

| | | |
|---|---|---|
| 1013805 | 9/1985 | European Pat. Off. |
| 57-59943 | 4/1982 | Japan |
| 59-82406 | 5/1984 | Japan |

Primary Examiner—Carman J. Seccuro

[57] ABSTRACT

Blends of high molecular weight linear polyethylene and low molecular weight linear polyethylene provide improved staple fiber-forming capabilities over that found with either polymer taken alone. Preferably at least one of the polymers used in the blend is a linear low density polyethylene, LLDPE, which is a linear polyethylene comprising ethylene copolymerized with an amount of a higher alpha-olefin which causes the density of the copolymer to be less than that of a homopolymer made using the same process and catalyst. The higher alpha-olefin can be at least one in the $C_3$–$C_{12}$ range, preferably in the $C_3$–$C_8$ range.

15 Claims, No Drawings

LINEAR ETHYLENE POLYMER STAPLE FIBERS

CROSS-REFERENCE TO RELATED APPLICATIONS

This is a continuation-in-part of pending application Ser. No. 339,335 filed Apr. 17, 1989, now U.S. Pat. No. 4,990,204 which is, itself, a continuation of pending application Ser. No. 114,169, filed Oct. 27, 1987, now U.S. Pat. No. 4,842,922. These are incorporated herein by reference.

FIELD OF THE INVENTION

Improvements are made in the making of staple fibers and fibrous products from high molecular weight linear ethylene polymer by blending with a low molecular weight linear ethylene polymer.

BACKGROUND OF THE INVENTION

Linear low density polyethylene (LLDFE) is an ethylene polymer prepared using a coordination catalyst in the same manner used in preparing linear high density polyethylene (HDFE), and is actually a copolymer of ethylene and at least one higher alpha-olefin. The expression "linear ethylene polymers" includes those linear ethylene polymers which have from 0 percent to about 30 percent of at least one higher alpha-olefin of 3 to 12 carbon atoms copolymerized with the ethylene.

According to Modern Plastics Encyclopedia, linear high density polyethylene generally has a density in the range of about 0.941 gm/cm$^3$ to about 0.965 gm/cm$^3$. Skilled artisans realize that the density can vary in accordance with the reaction conditions and type of catalyst used. It is also known that densities a little above that range can be achieved by special techniques, such as by annealing the polymer. It is known that polymerization conditions which will produce a homopolymer having a density of about 0.965 gm/cm$^3$ will produce a copolymer of ethylene and higher alphaolefin having a density lower than the said 0.965 gm/cm$^3$, the extent of the lowering of the density being directly related with the amount of the higher alphaolefin used.

It is known from EFO 85 101380.5 (U.S. Pat. No. 4,830,907) that linear low density polyethylene (LLDFE) can be made into fibers by melt-spinning and that even very fine fibers can be produced.

It is known from U.S. Pat. No. 4,578,414 that wettable fibers of polyethylene, including LLDFE, can be prepared from polyethylene having incorporated therein certain wetting agents.

The manufacture of LLDFE is disclosed. e.g., in U.S. Pat. No. 4,076,698, which discloses that the LLDFE can be extruded as a monofilament and then cold drawn. It is shown as being a copolymer of ethylene and at least one other higher alpha-olefin. The density of the LLDPE is dependent on the amount of the higher alphaolefin in the copolymer.

Whereas LLDPE has been introduced in the market place as a polymer suitable for making fibers, it is known that not all versions and varieties of LLDFE are entirely adequate for commercial production of staple fibers and the fabric strength of carded staple-based fabrics has generally been significantly less than fabrics made from carded staple-based polypropylene fibers.

It is recognized in the art of making LLDPE polymers that the density of the LLDPE is affected by the amount and kind of olefin comonomer which is copolymerized with the ethylene and, to some extent, by the process conditions and catalyst used. A given mole percent of, e.g., propylene in the copolymer will reduce the density of the polyethylene less than the same mole percent of a higher olefin comonomer. The MFR (melt flow rate as measured by ASTM D-1238) is also affected to some degree by the kind and amount of olefin comonomer in the copolymer, and is also affected to some extent by the coordination catalyst used, the polymerization conditions, and/or by any telogens or chain regulators or other reactants which may be present during polymerization.

It is also recognized in the art that there are important distinctions between linear polyethylenes (which includes LLDPE polymers), and branched-chain ethylene polymers, which are made using a free-radical catalyst and are generally referred to as LDPE (low density polyethylene), and were also known in the past as ICI-type polyethlyene and as HPFE (high pressure polyethylene). This disclosure deals with linear polyethylenes.

SUMMARY OF THE INVENTION

We have now found that blends, either discrete blends or in-situ polymerized blends, of linear ethylene polymers, especially LLDFE, having certain properties, are surprisingly well suited for making staple fibers and yield products having strengths more competitive with those attainable in carded, thermally bonded webs of polypropylene, and furthermore the blends are also particularly well suited for making other forms of fibers and products made from such other fibers, including spunbonded, or spun-laid and subsequently thermalbonded, nonwoven fabric manufacturing processes. These blends have a broader molecular weight distribution than a sole linear ethylene polymer resin produced at the same MFR (melt flow rate).

DETAILED DESCRIPTION INCLUDING BEST MODE KNOWN

In one aspect, the invention is perceived as a means for improving the fiber-making capability of high molecular weight linear polyethylene, especially LLDPE polymers, by blending it with a low molecular weight linear polyethylene.

In another aspect it is perceived as a blend of high and low molecular weight linear polyethylenes, especially LLDFE, said blend being particularly well suited for staple fiber manufacture, and subsequent thermally bonded webs, in commercial operations.

In yet another aspect, it is perceived as a means for improving the strength of carded staple fiber webs and fabrics of linear polyethylene, by using a blend of high molecular weight linear polyethylene and low molecular weight linear polyethylene, especially where either one or both of the polymers are of the LLDFE variety. Most preferably, both of the linear polymers are of the LLDFE variety.

Blends wherein a high molecular weight linear polyethylene, especially LLDPE, and a low molecular weight linear polyethylene, especially LLDFE. are uniformly blended and used in making fibers, are found to exhibit not only the good hand, softness, and drape which one might expect of a linear polyethylene, especially the LLDPE variety, but a carded, thermally bonded web (fabric) of surprisingly high strength is produced at spinning rates which are very suitable for commercial operations.

In the presently claimed invention, the important thing is to blend an appropriate amount of the low molecular weight linear polymer with the high molecular weight polymer to produce the improvement in making staple fibers from the high molecular weight polymers. We have found that in obtaining the desired improvement, the blends which are preferred will have a blend density of above about 0.93 gm/cm$^3$ and as much as 0.96 gm/cm$^3$, especially 0.94 to about 0.96 gm/cm$^3$.

In this disclosure the expression "discrete blends" is in reference to the mixing of linear polymers which are made separate from each other, each under its own set of reaction conditions, possibly at different times and/or places, the mixing taking place after the polymer has been collected from the respective reactors.

The expression "in-situ polymerized blends" is in reference to blends of at least two linear polymers which have differing properties and which are prepared conjointly, but under differing reaction conditions, whereby the properties of each are varied, one from another, and the so-prepared polymers are immediately and intimately mixed within the reaction system before removal therefrom. There are several ways known by skilled artisans for making in-situ polymerized blends, such as in U.S. Pat. No. 3,914,342, and the invention is not limited to any one of the methods.

The linear ethylene polymer resin used for the high molecular weight portion of the blend of the present invention can be any which may contain an amount of a $C_3$ to $C_{12}$ olefin comonomer, copolymerized with the ethylene, sufficient to yield a density in the range of about 0.91 g/cm$^3$ to about 0.965 g/cm$^3$, and has a MFR of less than 25 g/10 min., preferably less than 20 g/10 min. Preferably, the comonomer is a $C_3$ to $C_8$ olefin, such as propylene, butene-1, hexene-1, 4-methyl pentene-1, octene-1, and the like, especially octene-1, and can be a mixture of olefins such as butene/octene or hexene/octene. The above stated MFR and density ranges include linear polyethylenes which contain no comonomer as well as those which contain at least one comonomer.

The linear ethylene polymer resin used for the low molecular weight portion of the present blend can be any which contains an amount of $C_3$ to $C_{12}$ olefin comonomer, copolymerized with the ethylene, sufficient to yield a density in the range of about 0.91 g/cm$^3$ to about 0.965 g/cm$^3$, and has a MFR of greater than 25 g/10 min. preferably greater than 40 g/10 min. Preferably, the comonomer is a $C_3$ to $C_8$ olefin, such as propylene, butene-1, hexene-1, 4-methyl pentene-1, octene-1 or the like, especially octene-1, and can be a mixture of olefins such as butene/octene or hexene/octene. The above stated MFR and density ranges also apply to linear polyethylenes which contain no comonomer as well as those which contain at least one comonomer.

The melt flow rate (MFR) of the polymers is measured in accordance with ASTM D-1238 using Condition E (aka 190/2.16) unless otherwise specified and is a measurement of the amount (grams) of melted polymer which is extruded from the orifice of the melt index barrel in 10 minutes. The MFR, often referred to as melt index (MI), is an indication of relative molecular weight, with a given MFR numerical value indicating a higher molecular weight than a greater MFR numerical value.

Gel permeation chromatography (herein called "GFC"), also known as "size exclusion chromatography", is a measurement made to characterize molecular weight distribution of a polymer and is well known in the industry. Data reported by this GFC technique includes weight average molecular weight ($MW_{wa}$), number average molecular weight ($MW_{na}$), and weight average molecular weight divided by number average molecular weight ($MW_{wa}/MW_{na}$). Of these, the $MW_{wa}/MW_{na}$ is of the most interest, indicating broadness of molecular weight distribution. The higher the $MW_{wa}/MW_{na}$ ratio, the broader the molecular weight distribution (sometimes called polydispersity) of the resin. Molecular weight distribution, indicated by $MW_{wa}/MW_{na}$, or "Q", or by the ratio of $I_{10}$ divided by $I_2$ (as measured by ASTM D-1238) has been found to influence thermal bonding of staple fiber. We find that resins having Q values above about 4.5, or $I_{10}/I_2$ values above about 7 have shown extreme utility in broadening the thermal bonding window of staple fibers made from linear polyethylene. (The "bonding window" is the temperature range over which staple fiber can be satisfactorily thermally bonded.) For example, two linear polyethylenes having MFR of about 17 grams/10 minutes and a density of about 0.950 g/cm$^3$, but different $I_{10}/I_2$ values, have two distinctly different Vicat softening points (as measured by ASTM D-1525). The narrower molecular weight distribution resin having $I_{10}/I_2$ of 6.61 has a Vicat softening point of about 123° C., while the broader molecular weight distribution resin having $I_{10}/I_2$ of 10.95 has a Vicat softening point of about 118° C. The peak melting point for the resins discussed above is about 128° C. (as measured by differential scanning calorimetry). The difference between the peak melting point and the softening point is considered to be indicative of the thermal bonding window (range) of staple fiber. Thus the bonding window is greater for fiber made from resin with higher Q values. Likewise, fibers made from resin with higher $I_{10}/I_2$ ratios will have broader thermal bonding windows compared to fibers made from resin at about equal melt index and density at lower $I_{10}/I_2$ ratios.

The tensile strength of a thermally bonded web (fabrics) is measured on 1-inch by 4-inch (2.54 cm by 10.16 cm) samples normalized to 1-ounce/yard$^2$ (about 33.9 gm/m$^2$) as "grams force at break". The tenacity of fibers is measured as "grams/denier".

It has been found to be difficult to make fine denier staple fibers of linear polyethylene for conversion into carded thermally bonded webs, especially at the high production rates and broad thermal bonding windows normally desired in commercial operations, which result in fabrics having typically more than about 50 percent of the tensile strength (tenacity) of fabrics obtained for carded, thermally bonded polypropylene staple fiber at comparable MFR's. Greater strength of thermally bonded linear polyethylene staple fiber, including LLDFE, is desirable in various products, such as, for example, diaper cover stock, medical garments and feminine hygiene products.

Since the formation of staple fibers includes such complex and varied operations as melt drawing, mechanical stretching, crimping, and cutting, the requirements for the resin are rigorous. The first requirement of the resin is to withstand the melt drawing of the spinneret extrudate to a filament size ranging from approximately 1 to 1g denier at commercially feasible throughputs, especially throughputs ranging from about 0.01 to about 1.2 gm/min./hole. These throughput variations are dependent not only upon desired production rates, but also equipment design limitations (such as compact melt spinning as compared to conventional melt spinning). Subsequently, this resultant filament can be stretched at draw ratios ranging up to 6:1 to produce filament at the final desired fiber size, typically ranging from 0.5 to 6.0 denier.

After stretching (drawing) the fiber to the appropriate denier size the fiber is crimped, via a stuffer box, air texturizer or other device, and then cut to the desired length. Crimping imparts a thermomechanical deformation to the fiber, causing it to have numerous bends and greater entanglement. These bends, or crimps, are useful when carding fiber in order to create some degree of web cohesion prior to bonding. Staple fiber, especially for non-woven applications is usually carded into a web for further bonding into fabric.

Typical bonding techniques include hydrodynamic entanglement (commonly referred to as spunlacing), chemical bonding, and most frequently, thermal bonding. Thermal bonding is typically accomplished by passing carded web through heated calender rolls, infra-red oven, ultrasonic bonding device, or through-air bonder. Most frequently, thermal fixation of these carded webs is achieved via heated calender bonding. The technique used to differentiate these various polyethylene resins will be described farther on in this disclosure, but it employs essentially all of these processing steps.

The initial requirement of good melt draw-down of the filaments into small diameter fibers under the desired production conditions makes staple fiber spinning with a relatively high molecular weight resin very difficult. While it is already realized that increasing molecular weight of a polymer results in an increased strength (tenacity) of articles formed from that resin, the increased molecular weight also results in much greater staple spinning problems. That is, the higher molecular weight linear polyethylenes (including LLDFE) resins are not well suited for spinning at commercially viable and economical rates. What has not been known is that there are unexpected benefits obtained by blending a low molecular weight linear polyethylene, especially LLDPE, with a high molecular weight linear polyethylene, especially LLDPE, especially in spinning, then carding and bonding staple fiber made from these polymers.

For purposes of describing the present invention, a linear polyethylene, (including HDFE and LLDFE) having a MFR value of less than 2g, preferably less than 20, especially less than g, and as low as 0.1, is considered to be in the high molecular weight range: the lower the MFR value, the higher is the molecular weight. Linear polyethylene having a MFR value in the range of 25-40 may, in some aspects, be considered to be an "intermediate" molecular weight range, but in relating the present invention, it is considered as being on the "high" end of the low molecular weight range. Linear polyethylene having a MFR in the range above 40, especially above 45, is considered to be in the low molecular weight range and is not considered (in relating the present invention) to be in an "intermediate" molecular weight range. Whereas MFR values exceeding g00 can be used as the low molecular weight resin, especially if the high molecular weight portion of the present blend has a MFR value below 1 or 2, it is preferred that the MFR values of the low molecular weight resin be not more than 600, preferably not more than 500. Above 500-600 MFR, one might encounter problems such as diminished melt strength properties. In a general sense, one should consider that the lower the MFR value of the high molecular weight resin, the greater the need to blend it with an off-setting amount of a linear polyethylene having a high MFR value as the low molecular weight resin.

One can calculate the MFR values and the density values of the polymers used in the blends of the present invention and obtain values which are reasonably close to the actual values obtained by actual measurement of the blend.

The following formula may be used to calculate the melt index of polymer blends:

$$\ln \text{blend} = (\text{fraction A})\ln A + (\text{fraction B}) \ln B$$

The following formula may be used to calculate the density of polymer blends:

$$\rho\text{blend} = (\text{fraction A})\rho A + (\text{fraction B})\rho B$$

The present invention employs, in a blend, an amount of low molecular weight linear polyethylene which is effective in overcoming the deficiencies of high molecular weight linear polyethylene in the making of staple fiber based webs or fabrics and enables one to utilize the high molecular weight linear polyethylene in the demanding processing conditions of staple fiber spinning, carding and bonding, while substantially maintaining the inherent strength of the resin. This strength, when evaluated in bonded fabric form, improves by as much as 165 percent or more at a comparable MFR's. The strengths of thermally bonded fabric made from these higher molecular weight blended resins, approach the strength of typical commercial polypropylene-based fabrics by as much as 75 percent or more.

The thermally bonded webs or fabrics prepared using the blends of the present invention can be made wettable by incorporating into one or both of the polymers certain additives such as in U.S. Pat. No. 4,578,414. Furthermore, the addition of minor amounts of additives, such as colorants and pigments is within the purview of the present invention.

The webs or fabrics made using the present blends exhibit excellent softness, good gamma irradiation stability, high strength, and good thermal bondability to itself and to other thermoplastic films or webs, such as other polyolefins.

The ratio of high molecular weight linear polyethylene to low molecular weight linear polyethylene in the blend is largely dependent on the MFR of each. Generally, the amount of low molecular weight polymer used in modifying the high molecular weight polymer is desirably about the minimum amount needed to render the high molecular weight polymer processable at the desired spinning rate and denier size and to improve thermal bonding strength of fabrics made therefrom. Conversely, the amount of high molecular weight polymer added to the low molecular weight polymer is desirably an amount needed to render the low molecular polymer processable at the desired spinning rate and denier size and to improve thermal bonding strength of fabrics made therefrom.

The following examples illustrate some embodiments of the present invention, but the invention is not limited to these specific embodiments.

EXAMPLE I

A discrete polymer blend comprising 40g by weight linear polyethylene (ethylene/octene, 2.3 MFR, 0.917 g/cm³) and 60% linear polyethylene (ethylene/octene, 105 MFR, 0.953 g/cm³), a blended density of 0.939 g/cm³, a blended MFR of 23, and a Q-value of about 6.82 is formed into fiber at about 0.4 g/min/hole. Fabric made from the resulting fiber has a maximum 1" (2.54 cm) strip tensile strength at 2686 gram-to-break (normalized) which is more than 55% of commercially available fiber-grade polypropylene and over 140 g of commercially available polyethylene at a comparable MFR. Data are shown in Table I.

A test on the above polymer blend is performed as follows: A one inch diameter extruder, 24 inches in length, containing a high shear type screw was used to melt and convey polymer to a positive displacement gear pump, which accurately metered polymer to the spin pack. Many different screw designs may be used, including one commonly used in the extrusion industry for polyethylene, i.e., the low shear or barrier type screw. Spin pick configuration may vary considerably, but that used in tests described here-in had, as its major components, a 40 micron sintered metal filter media and a spinneret which had hole size of 600 microns, with length-to-diameter ratio of 4:1. Fibers are collected continuously onto spools using godet speeds necessary to achieve the desired denier per filament (dpf), relative to the throughput. For example, a throughput of about 0.4 gms/min./hole requires a corresponding 6 inch (15.24 cm) diameter godet speed of about 2600 revolutions per minute to achieve about 3.0 dpf. For all the tests herein, fibers were melt spun; that is, the draw ratio was 1:1, with no additional drawing. After collection of sufficient sample size, the fibers are cut off of the collection spool and cut into 1.5-inch (3.81 cm) staple fibers. Samples of these staple fibers (each 1.25 gm) are weighed out and formed into slivers using a Roto Ring (manufactured by Spinlab. Inc.); a sliver is an ordered collection of fibers such that the fiber ends are randomized while the fibers themselves are all paralleled. The structure is about 10 cm wide by about 25.4 cm long after gently opening the sliver tow. This opened sliver tow (simulating a carded web) is then fed into a Beloit Wheeler calender bonder for thermal tie down of the filaments where pressure and temperature are adjusted for optimal bonding conditions and fabric strength.

The fibers produced from the blend described above are found to have optimum bonding conditions at a top roll (or embossed roll with about 20 percent land area) temperature of about 115° C and a bottom roll (smooth roll) temperature of about 118° C. The bonding pressure is typically found to be optimal at about 700 psig (4927.9 kPa) or about 199 pli (pounds per linear inch) (90.3 kgs/linear 2.54 cm or 35.6 kgs/linear cm). After forming a sufficient number of thermally bonded fabrics under the same bonding conditions, a single sample is cut out of each bonded strip which measures 2.54 by 10.16 cm. These samples are individually weighed and then tensiled by use of an Instron tensile tester affixed with a data systems adapter for measuring and recording load and displacement. The mean value of the force required to break this fabric strip, normalized to one ounce per square yard weight, is about 2686 grams (bonded fabric tenacity).

The above procedure is also carried for Examples II-XIII.

EXAMPLE II (for comparison; not example of invention)

A commercially available LLDPE, ethylene/octene copolymer, having a MFR of about 26, a density of about 0.940 g/cm³, and a Q-value of about 3.74 is formed into fiber at about 0.4 g/min/hole. Fabric made from the fibers has a maximum 1" (2.54 cm) strip tensile strength of 1855 g-to-break (normalized) which is less than 40% of commercially available fiber-grade polypropylene. Data are shown in Table I.

EXAMPLE III

A blend comprising 50 percent by weight of linear ethylene polymer (ethylene/octene, 52 MFR, 0.953 density) and 50 percent by weight of linear ethylene polymer (ethylene/octene, 12 MFR, 0.936 density) is found to have a bonded web peak strip tensile of about 2400 gms. Blend MFR is about 25 and blend density is about 0.945 g/cm³. See Table I below.

TABLE I

| Example | Type | MFR | Density | Q-value | Tenacity, g |
|---|---|---|---|---|---|
| I | discrete blend | 23 | 0.939 | 6.82 | 2686 |
| II | LLDPE, single | 26 | 0.940 | 3.74 | 1855 |
| III | discrete blend | 25 | 0.945 | NM* | 2400 |

*NM = not measured

EXAMPLE IV (for comparison; not example of invention)

A commercially available LLDPE, ethylene/octene copolymer, having a MFR of about 12, a density of about 0.935 g/cm³, and a Q-value of about 4.36 is formed into fiber at about 0.4 g/min/hole. Fabric made from the resulting fiber has a maximum 1" (2.54 cm) strip tensile strength of about 2700 g-to-break (normalized) which is less than 60g of commercially available fiber grade polypropylene. Data are shown in Table II.

EXAMPLE V

An in-situ polymerized reactor blend (ethylene/octene copolymer) having a blended MFR of about 11, a blended density of about 0.934 g/cm³, and a Q-value of about 13.6 is formed into a fiber at about 0.4 g/min/hole. Fabric made from the resulting fiber has a maximum 1" (2.54 cm) strip tensile strength (tenacity) of about 3700 g-to-break (normalized) which is about 80% of commercially available fiber-grade polypropylene and about 140% of commercially available polyethylene at a comparable MFR. Data are shown in Table II.

TABLE II

| Example | Type | MFR | Density | Q-value | Tenacity/g |
|---|---|---|---|---|---|
| IV | LLDPE, single | 12 | 0.935 | 4.36 | 2700 |
| V | reactor blend | 11 | 0.934 | 13.6 | 3700 |

EXAMPLE VI

An in-situ polymerized reactor blend (ethylene/octene copolymer) having a blended MFR of about 10, a blended density of about 0.955 gm/cm³ and a Q-value of about 8.87 is formed into a fiber at a throughput of about 0.4 gm/min./hole. Fabric samples of 1" (2.54 cm) made from the resulting fiber has a maximum strip tensile strength (tenacity) of about 3614 gms-to-break (normalized) which is about 78% of that of commercially available fiber grade polypropylene and 129% of commercially available polyethylene at a comparable MFR (see Example VII for comparison). The following data indicates tenacity and bonding temperature for g tests. Also, some data are shown in Table III.

| | 1 | 2 | 3 | 4 | 5 | 6 |
|---|---|---|---|---|---|---|
| Bonding Temp. °C. | 119 | 120 | 121 | 122 | 123 | 124 |
| (embossed/smooth) | 121 | 122 | 123 | 124 | 126 | 127 |
| PLI (kgs/linear cm) | 200 (35.7) | 200 (35.7) | 200 (35.7) | 200 (35.7) | 200 (35.7) | 200 (35.7) |
| Gms. Force at Break (normalized) | 2260 | 2427 | 3341 | 3614 | 3494 | 3246 |

EXAMPLE VII (for comparison: not example of Invention)

A commercially available high density linear, ethylene/propylene copolymer, having a MFR of about 12, a density of about 0.95 gm/cm³, and a Q value of about 3.92 is formed into fiber at about 0.4 gm/min./hole. Fabric made from the resulting fiber has a maximum 1" (2.54 cm) strip tensile strength of about 2794 gm-to-break (normalized) which is less than 60% of commercially available fiber grade polypropylene. The following chart of data indicates tenacity and bonding temperature for g tests. Also see Table III.

| | 1 | 2 | 3 | 4 |
|---|---|---|---|---|
| Bonding Temp. °C. | 118 | 119 | 120 | 121 |
| (embossed/smooth) | 120 | 121 | 122 | 123* |
| PLI (kgs/linear cm) | 200 (35.7) | 200 (35.7) | 200 (35.7) | 200 (35.7) |
| Gms. Force at Break (normalized) | 1836 | 2647 | 2794 | 2481 |

*stick point

TABLE III

| Example | Type | MRF | Density | Q-value | Tenacity, g. |
|---|---|---|---|---|---|
| VI | reactor blend | 10 | 0.955 | 8.87 | 3614 |
| VII | sole linear PE | 12 | 0.950 | 3.92 | 2794 |

EXAMPLE VIII (for comparison; not claimed invention)

A commercially available fiber-grade polypropylene (PP) is spun into fibers and made into a heat-bonded fabric. The PP had a 15.6 MFR (@190° C.) and 0.91 density. The following data indicates tenacity and temperature for 5 tests:

| | 1 | 2 | 3 | 4 | 5 |
|---|---|---|---|---|---|
| Bonding Temp. °C. | 138 | 138 | 140 | 142 | 144 |
| (embossed/smooth) | 140 | 140 | 142 | 144 | 147* |
| PLI (kgs/linear cm) | 75 (13.4) | 224 (40) | 200 (35.7) | 200 (35.7) | 200 (35.7) |
| Gms. Force at Break (normalized) | 2980 | 3485 | 4699 | 4307 | 3881 |

*stick point

EXAMPLE IX

A discrete blend comprising 50 percent by weight of linear ethylene polymer (ethylene/octene, 12 MFR, 0.935 density) and 50 percent by weight of linear ethylene polymer (ethylene-octene, 105 MFR, 0.953 density) is spun into fibers and a bonded web (fabric) is obtained. The blend has a calculated MFR of 35.5 and density of 0.944. Bonding temperature and tenacity is shown below at different bonding pressures. Also see Table IV.

| | 1 | 2 |
|---|---|---|
| Bonding Temp. °C. | 118 | 118 |
| (embossed/smooth) | 120 | 120 |
| PLI (kgs/linear cm) | 75 (13.4) | 200 (35.7) |
| Gms. Force at Break (normalized) | 2355 | 2297 |

EXAMPLE X

A discrete blend comprising 70 percent by weight of linear ethylene polymer (ethylene/octene, 18 MFR, 0.93 density) and 30 percent by weight of linear ethylene polymer (ethylene/octene, 105 MFR, 0.953 density) and having a calculated MFR of 30.5 and density of 0.937, is spun into fibers and bonded as a fabric in 3 tests; data are shown below. Also see Table IV.

| | 1 | 2 | 3 |
|---|---|---|---|
| Bonding Temp. °C. | 114 | 116 | 117 |
| (embossed/smooth) | 117 | 118 | 119 |
| PLI (kg/linear cm) | 200 (35.7) | 200 (35.7) | 200 (35.7) |
| Gms. Force at Break (normalized) | 2190 | 2243 | 2586 |

EXAMPLE XI (for comparison; not claimed invention)

A linear ethylene polymer (ethylene/octene) having a MFR of 30 and a density of 0.94 g/cm³ is found to have a maximum bonded web tensile strength of about 1531 gms. See Table IV below.

TABLE IV

| Example | Type | MFR | Density | Tenacity/g. |
|---|---|---|---|---|
| IX | discrete blend | 35.5 | 0.944 | 2355 |
| X | discrete blend | 30.5 | 0.937 | 2586 |
| XI | LLDPE, single | 30 | 0.94 | 1531 |

EXAMPLE XII

A discrete blend comprising 71% by weight of a linear ethylene polymer (ethylene/propylene, 8 MFR, 0.952 density) and 29% b weight of linear ethylene polymer (ethylene/octene, 105 MFR, 0.954 dens.) and having a calculated MFR of 17 and density of 0.953 g/cm³ is spun into staple fibers and bonded into fabric at 200 PLI (35.7 kg/linear cm). Data are shown below. Also see Table V below.

| | 1 | 2 | 3 | 4 | 5 | 6 | 7 |
|---|---|---|---|---|---|---|---|
| Bond Temp. °C. | 116 | 117 | 118 | 119 | 120 | 121 | 122 |
| (emb/smooth) | 118 | 119 | 120 | 121 | 122 | 123 | 124* |
| Gms. Force | 1868 | 2034 | 2259 | 2596 | 2620 | 3066 | 3034 |

| | 1 | 2 | 3 | 4 | 5 | 6 | 7 |
|---|---|---|---|---|---|---|---|
| at Break | | | | | | | |

*stick point

EXAMPLE XIII (for comparison; not claimed invention)

A linear ethylene polymer (ethylene/propylene copolymer) having a MFR of 17 and a density of 0.95 g/cm$^3$ is spun into fibers and bonded as a fabric at 200 PLI (35.7 kg/linear cm). Data are shown below. Also see Table V below.

| | 1 | 2 | 3 | 4 | 5 |
|---|---|---|---|---|---|
| Bonding Temp. °C. | 116 | 117 | 118 | 119 | 120 |
| (embossed/smooth) | 118 | 119 | 120 | 121 | 122* |
| Gms. Force at Break | 2016 | 2213 | 2202 | 2749 | 2837* |

*stick point

TABLE V

| Example | Type | MFR | Density | Tenacity/g |
|---|---|---|---|---|
| XII | discrete blend | 17 | 0.953 | 3066 |
| XIII | sole linear PE | 17 | 0.95 | 2749 |

We claim:

1. Staple fiber having a broad thermal bonding window prepared from a blend of linear ethylene polymers, wherein said blend is melt drawn to approximately 1 to 15 denier at commercially feasible throughput rates, optionally followed by mechanical drawing to produce fiber sizes of less than 6.0 denier/filament, said blend comprising an amount of high molecular weight linear ethylene polymer having a MFR value within the range between 0.1 to 25 g/10 minutes and a density aboe 0.918/cm$^3$, and an amount of low molecluar weight linear ethylene polymer having a MFR value within the range of greater than 25 to 600 g/10 minutes and a density above 0.91 g/cm$^3$ sufficient to provide a blend having a Q value above about 4.5.

2. The staple fiber of claim 1 wherein the ratio of the high molecular weight linear ethylene polymer and low molecular weight linear ethylene polymer is sufficient to provide a blend having a MFR value in the range of 1 to 40 g/10 minutes and a density in the range of about of 0.91 to 0.96 g/cm$^3$.

3. The staple fiber of claim 2 wherein the high molecular weight linear ethylene polymer is LLDPE having a MFR value within the range between 0.1 and 25 g/10 minutes and the low molecular weight linear ethylene polymer is LLDPE having a MFR value within the range of greater than 25 to 300 g/10 minutes.

4. The staple fiber of claim 2 wherein the high molecular weight linear ethylene polymer is HDPE having a MFR value within the range between 0.1 and 25 g/10 minutes and the low molecular weight linear ethylene polymer is HDPE having a MFR value within the range of greater than 25 to 300 g/10 minutes.

5. The staple fiber of any one of claims 1, 2, 3 or 4 wherein at least one of the linear ethylene polymers comprises a copolymer of ethylene with at least one $C_3$-$C_{12}$ olefin.

6. The staple fiber of claim 5 wherein each of the linear ethylene polymers comprises a copolymer of ethylene with at least one $C_3$-$C_8$ olefin.

7. The staple fiber of claim 5 wherein at least one of the linear ethylene polymers is a copolymer of ethylene and octene.

8. The staple fiber of claim 5 wherein at least one of the linear ethylene polymers is a terpolymer of ethylene, butene and octene.

9. The staple fiber of claim 5 wherein at least one of the linear ethylene polymers is a terpolymer of ethylene with hexene and octene or 4-methylpentene-1 and ocetene.

10. The staple fiber of claim 5 wherein at least one of the linear ethylene polymers is a copolymer of ethylene and propylene.

11. The staple fiber of claim 1 wherein the blend is a blend of discrete polymers.

12. The staple fiber of claim 1 wherein the blend is an in-situ blend formed during polymerization.

13. The staple fiber of claim 11 or 12 wherein the blend has a density greater than about 0.93 g/cm$^3$.

14. The staple fiber of claim 11 or 12 wherein the blend has a density between about 0.94 g/cm$^3$ and 0.96 g/cm$^3$.

15. The staple fiber of claim 11 or 12 wherein the high molecular weight linear ethylene polymer is HDPE, having a MFR value within the range between 0.1 and 25 g/10 minutes and the low molecular weight linear ethylene polymer is HDPE having a MFR value within the range of greater than 25 to 300 g/10 minutes.

* * * * *

UNITED STATES PATENT AND TRADEMARK OFFICE
CERTIFICATE OF CORRECTION

PATENT NO. : 5,112,686
DATED : May 12, 1992
INVENTOR(S) : Stephen P. Krupp, John O. Bieser, Edward No. Knickerbocker It is certified that error appears in the above-indentified patent and that said Letters Patent is hereby corrected as shown below:

Column 11, line 40, change "aboe" to read --above--.

Column 11, line 41, change "0.918/cm3" to read --0.91 g/cm3--.

Column 12, line 30, change "oce-" to read -- oc- --.

Signed and Sealed this

Seventh Day of September, 1993

Attest:

BRUCE LEHMAN

Attesting Officer     Commissioner of Patents and Trademarks